United States Patent
Keller et al.

(10) Patent No.: US 9,202,139 B2
(45) Date of Patent: Dec. 1, 2015

(54) SYSTEM, METHOD, AND COMPUTER PROGRAM PRODUCT FOR GENERATING A SUBSET OF A LOW DISCREPANCY SEQUENCE

(71) Applicant: NVIDIA Corporation, Santa Clara, CA (US)

(72) Inventors: Alexander Keller, Berlin (DE); Nikolaus Binder, Berlin (DE)

(73) Assignee: NVIDIA Corporation, Santa Clara, CA (US)

( * ) Notice: Subject to any disclaimer, the term of this patent is extended or adjusted under 35 U.S.C. 154(b) by 198 days.

(21) Appl. No.: 13/896,251

(22) Filed: May 16, 2013

(65) Prior Publication Data

US 2014/0023282 A1 Jan. 23, 2014

Related U.S. Application Data

(60) Provisional application No. 61/672,974, filed on Jul. 18, 2012.

(51) Int. Cl.
*G06K 9/62* (2006.01)
*G06T 15/06* (2011.01)
*G06T 15/50* (2011.01)

(52) U.S. Cl.
CPC .............. *G06K 9/6218* (2013.01); *G06T 15/06* (2013.01); *G06T 15/506* (2013.01)

(58) Field of Classification Search
None
See application file for complete search history.

(56) References Cited

U.S. PATENT DOCUMENTS

| | | | |
|---|---|---|---|
| 6,370,270 B1 * | 4/2002 | Nair et al. | 382/209 |
| 6,911,976 B2 * | 6/2005 | Abramov | 345/426 |
| 6,990,238 B1 * | 1/2006 | Saffer et al. | 382/224 |
| 7,952,583 B2 * | 5/2011 | Waechter et al. | 345/426 |
| 8,266,623 B2 | 9/2012 | Keller et al. | |
| 2002/0102018 A1 * | 8/2002 | Lin et al. | 382/165 |
| 2002/0147568 A1 * | 10/2002 | Wenzel et al. | 702/167 |
| 2003/0031357 A1 * | 2/2003 | Wenzel et al. | 382/154 |
| 2005/0264564 A1 * | 12/2005 | Keller | 345/421 |
| 2005/0264565 A1 * | 12/2005 | Keller | 345/421 |
| 2005/0264568 A1 * | 12/2005 | Keller | 345/426 |
| 2005/0275652 A1 * | 12/2005 | Keller | 345/419 |
| 2005/0275653 A1 * | 12/2005 | Keller | 345/419 |
| 2006/0146061 A1 * | 7/2006 | Keller | 345/581 |
| 2007/0046686 A1 * | 3/2007 | Keller | 345/581 |
| 2008/0231633 A1 * | 9/2008 | Keller et al. | 345/426 |
| 2009/0141026 A1 * | 6/2009 | Raab et al. | 345/424 |
| 2009/0225081 A1 * | 9/2009 | Keller et al. | 345/426 |

(Continued)

OTHER PUBLICATIONS

Morokoff et al., Quasi-random sequences and their discrepancies, SIAM J Sci, comput. vol. 15, No. 6, pp. 1251-1279, Nov. 1994.*

(Continued)

*Primary Examiner* — Chan Park
*Assistant Examiner* — Iman K Kholdebarin
(74) *Attorney, Agent, or Firm* — Zilka-Kotab, PC (57) ABSTRACT

A system, method, and computer program product are provided for generating a subset of a low discrepancy sequence. In use, a low discrepancy sequence is identified. Additionally, a threshold value is determined. Further, a single dimension of the low discrepancy sequence is selected. Further still, for each element included within the low discrepancy sequence, the selected single dimension is compared to the determined threshold value. Also, a subset of the low discrepancy sequence is generated, based on the comparing.

20 Claims, 4 Drawing Sheets

(56) References Cited

U.S. PATENT DOCUMENTS

| | | | | |
|---|---|---|---|---|
| 2010/0281480 | A1* | 11/2010 | Keller et al. | 718/100 |
| 2011/0025682 | A1* | 2/2011 | Keller et al. | 345/418 |
| 2012/0038643 | A1* | 2/2012 | Keller et al. | 345/426 |
| 2013/0194268 | A1* | 8/2013 | Wachter et al. | 345/426 |
| 2013/0207978 | A1* | 8/2013 | Keller et al. | 345/426 |
| 2014/0023282 | A1* | 1/2014 | Keller et al. | 382/225 |
| 2014/0122548 | A1* | 5/2014 | Keller | 708/105 |
| 2014/0146050 | A1* | 5/2014 | Raab et al. | 345/426 |
| 2014/0313198 | A1* | 10/2014 | Keller et al. | 345/426 |
| 2015/0042652 | A1* | 2/2015 | Keller et al. | 345/426 |

OTHER PUBLICATIONS

A Keller—Monte Carlo and Quasi-Monte Carlo Methods 2012, 2013—Springer Quasi-Monte Carlo image synthesis in a nutshell.*
A Keller—Parallel Quasi Monte Carlo Integration by partitioning low dscrepancy sequences, 2102, Mathematics.*
Appel, A., "An Efficient Program for Many-Body Simulation," SIAM J. Sci. Stat. Comput., vol. 6, No. 1, Jan. 1985, pp. 85-103.
Hickernell et al., "Extensible Lattice Sequences for Quasi-Monte Carlo Quadrature," SIAM J. Sci. Comput., 2001, pp. 1-22.
Karras, T., "Maximizing Parallelism in the Construction of BVHs, Octrees, and k-D Trees," High-Performance Graphics 2012, Eurographics Association, 2012, pp. 1-5.
Keller et al., "Deterministic Consistent Density Estimation for Light Transport Simulation," Monte Carlo and Quasi-Monte Carlo Methods 2012, Springer, 2013, pp. 1-14.
Keller, A., "Myths of Computer Graphics," Monte Carlo and Quasi-Monte Carlo Methods 2004, Springer, 2006, pp. 217-243.
Keller, A., "Quasi-Monte Carlo Image Synthesis in a Nutshell," In Monte Carlo and Quasi-Monte Carlo Methods 2012, Springer, 2012, pp. 1-37.
Keller et al., "Parallel Quasi-Monte Carlo Integration by Partitioning Low Discrepancy Sequences," Monte Carlo and Quasi-Monte Carlo Methods 2010, Springer, 2012, pp. 1-12.
Keller et al., "Quasi-Monte Carlo Progressive Photon Mapping," Monte Carlo and Quasi-Monte Carlo Methods 2010, Springer, 2012, pp. 1-11.
Niederreiter, H., "Random Number Generation and Quasi-Monte Carlo Methods," Society for Industrial and Applied Mathematics, 1992, pp. 1-245.
Walter et al., "Lightcuts: A Scalable Approach to Illumination," ACM Transactions on Graphics (Proceedings of SIGGRAPH 2005), 2005, pp. 1-10.
Walter et al., "Bidirectional Lightcuts," ACM Transactions on Graphics (TOG), Proceedings of ACM SIGGRAPH 2012, vol. 31, Issue 4, Jul. 2012, pp. 1-11.
Frolov et al., "On the Calculation of Certain Integrals Dependent on a Parameter by the Monte Carlo Method," Zh. Vychisl, Mat. Fiz., vol. 2, No. 4, 1962, pp. 714-717.
Frolov et al., "On the Calculation of Certain Integrals Dependent on a Parameter by the Monte Carlo Method," USSR Computational Mathematics and Mathematical Physics, vol. 2, No. 4, 1963, pp. 802-807 (EnglishTranslation).

* cited by examiner

SYSTEM, METHOD, AND COMPUTER PROGRAM PRODUCT FOR GENERATING A SUBSET OF A LOW DISCREPANCY SEQUENCE

CLAIM OF PRIORITY

This application claims the benefit of U.S. Provisional Application No. 61/672,974, filed Jul. 18, 2012, the entire contents of which are incorporated herein by reference.

FIELD OF THE INVENTION

The present invention relates to low discrepancy sequences, and more particularly to generating a subset of a low-discrepancy sequence.

BACKGROUND

Traditionally, photon mapping has been used to enhance the visual realism of generated images. For example, photon mapping may be used to generate realistic images by analyzing interactions between photons and surfaces of a scene. However, current techniques for performing photon mapping have been associated with various limitations.

For example, current methods for performing photon mapping include performing clustering and averaging. These procedures may result in approximation artifacts that may interfere with a user's perception of a generated image. There is thus a need for addressing these and/or other issues associated with the prior art.

SUMMARY

A system, method, and computer program product are provided for generating a subset of a low discrepancy sequence. In use, a low discrepancy sequence is identified. Additionally, a threshold value is determined. Further, a single dimension of the low discrepancy sequence is selected. Further still, for each element included within the low discrepancy sequence, the selected single dimension is compared to the determined threshold value. Also, a subset of the low discrepancy sequence is generated, based on the comparing.

DETAILED DESCRIPTION

Figure 1:
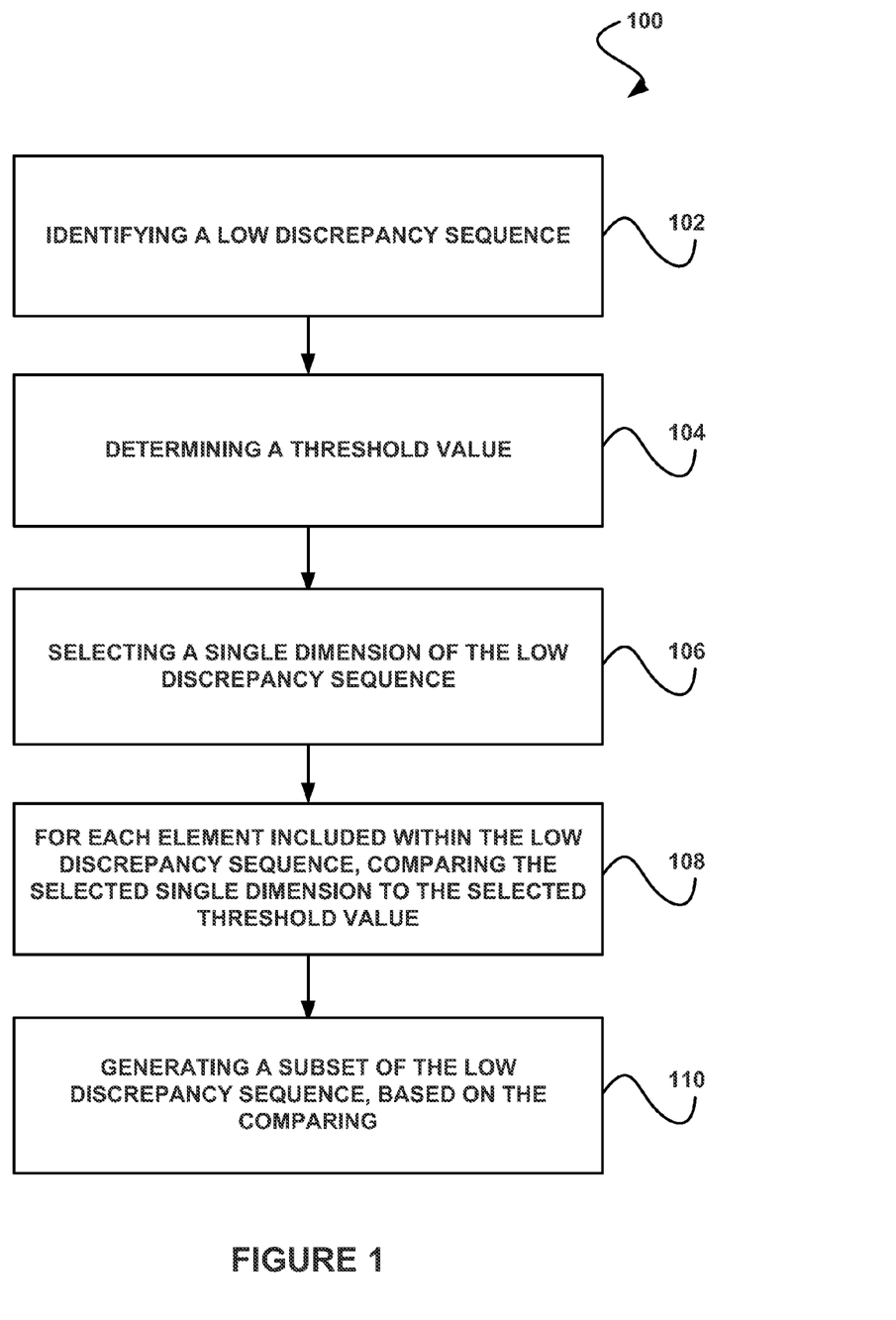
FIG. 1 shows a method for generating a subset of a low discrepancy sequence, in accordance with one embodiment.

FIG. 1 shows a method 100 for generating a subset of a low discrepancy sequence, in accordance with one embodiment. As shown in operation 102, a low discrepancy sequence is identified. In one embodiment, the low discrepancy sequence may be associated with an image plane. In another embodiment, the low discrepancy sequence may include a plurality of elements (e.g., vectors, etc.). For example, the low discrepancy sequence may include a sequence of vectors featuring a low discrepancy. In another embodiment, the low discrepancy sequence may include a sequence $(x_i, y_i)$, where $x_i$ represents dimensions of a sink path segment, and $y_i$ represents dimensions of a source path segment. Of course, however, the low discrepancy sequence may have any number of dimensions. In yet another embodiment, the low discrepancy sequence may include a deterministic low discrepancy sequence.

Additionally, in one embodiment, the low discrepancy sequence may include a (t,2)-sequence in base b. In another embodiment, the low discrepancy sequence may include a rank-1 lattice sequence. In yet another embodiment, the low discrepancy sequence may include a Halton sequence. In still another embodiment, the low discrepancy sequence may include a hybrid sequence. See, for example, "Quasi-Monte Carlo Image Synthesis in a Nutshell" (A. Keller), which describes hybrid sequences and is hereby incorporated by reference in its entirety. Of course, however, the low discrepancy sequence may include any sequence of vectors with a low discrepancy.

Further, in one embodiment, the low discrepancy sequence may include a plurality of dimensions sampling the image plane. For example, each vector within the low discrepancy sequence may represent a light transport path that passes through the image plane (e.g., a light transport path sampled from a high-dimensional path space including the image plane, etc.).

Further still, as shown in operation 104, a threshold value is determined. In one embodiment, the threshold value may include a single numerical value (e.g., a numerical value between zero and one, etc.). In another embodiment, the threshold value may vary according to one or more predetermined conditions, or may be determined based on one or more criteria. For example, the threshold value may be determined based on an importance of a location to be shaded. In yet another embodiment, the threshold value may be determined based on a parameter of an integro-approximation problem.

Also, as shown in operation 106, a single dimension of the low discrepancy sequence is selected. In one embodiment, the low discrepancy sequence may include a plurality of dimensions, and the single dimension may be one of those dimensions. For example, a plurality of elements (e.g., vectors, etc.) may be included within the low discrepancy sequence, and each element (e.g., vector, etc.) may have a value for each of the plurality of dimensions.

In addition, in one embodiment, the single dimension may be associated with an x dimension of the low discrepancy sequence, a y dimension of the low discrepancy sequence, etc. In yet another embodiment, the single dimension may be associated with a component of the low discrepancy sequence (e.g., an x component, a y component, etc.). In still another embodiment, the single dimension may be associated with a point (e.g., a point within the low discrepancy sequence, etc.), a vector, (e.g., a vector within the low discrepancy sequence, etc.), etc.

Further, as shown in operation 108, for each element included within the low discrepancy sequence, the selected single dimension is compared to the determined threshold value. For example, a value for the selected single dimension of each vector within the low discrepancy sequence may be compared to the determined threshold value. In one embodiment, comparing the determined threshold value to the selected single dimension may include determining for each element whether the determined threshold value is greater than the value for the selected single dimension of the element.

In another example, comparing the determined threshold value to the selected single dimension may include determining for each element whether the determined threshold value is less than the value for the selected single dimension of the element. In yet another example, comparing the determined threshold value to the selected single dimension may include determining for each element whether the determined threshold value is equal to the value for the selected single dimension of the element.

Further still, as shown in operation 110, a subset of the low discrepancy sequence is generated, based on the comparing. In one embodiment, the subset of the low discrepancy sequence may include a set of points. In another embodiment, each point within the set of points may have a plurality of dimensions. For example, the subset may include all the dimensions of the low discrepancy sequence except for the single selected dimension. For instance, a plurality of elements (e.g., points, etc.) may be included within the subset, and each element (e.g., point, etc.) within the subset may have a value for each of the plurality of dimensions.

Also, in one embodiment, for each element included within the low discrepancy sequence, if the value for the selected single dimension is determined to be less than the determined threshold value, the values for the remaining dimensions of that element may be included as values for dimensions of a new element of the subset. For example, if the low discrepancy sequence includes a plurality of vectors, for each vector included within the low discrepancy sequence, it may be determined whether the value of the selected single dimension of that vector is less than the determined threshold value. If the value of the selected single dimension of the vector is equal to or larger than the determined threshold value, the values for the remaining dimensions of that vector may not be included as a point within the subset. If the value of the selected single dimension of the vector is smaller than the determined threshold value, the values for the remaining dimensions of that vector may be included as a point within the subset.

In this way, the resulting subset of the low discrepancy sequence may have one less dimension than the low discrepancy sequence. For example, each element within the low discrepancy sequence may have s+1 dimensions, and each element within the subset may have s dimensions. Additionally, the resulting subset may also have a low discrepancy.

Additionally, in one embodiment, the threshold may be selected depending on a parameter of an integro-approximation problem, and the resulting subset may be used for numeric Integra-approximation. In another embodiment, the subset may be generated by a block-wise enumeration of the low discrepancy sequence. In yet another embodiment, the subset may be generated by leaping through the low discrepancy sequence (e.g., utilizing a predetermined stride, etc.).

In still another embodiment, the subset may be enumerated for a range defined by two thresholds. For example, for each element included within the low discrepancy sequence, the selected single dimension may be compared to two determined threshold values. In one embodiment, if the low discrepancy sequence includes a plurality of vectors, for each vector included within the low discrepancy sequence, it may be determined whether the value of the selected single dimension of that vector falls between the two determined threshold values, where the selected single dimension must be larger or equal to the smaller threshold and less than the larger threshold. In another embodiment, the remaining dimensions of that vector may be included as a point within the subset only when the value of the selected single dimension of the vector is between the two determined threshold values.

Further, in one embodiment, the subset of the low discrepancy sequence may be used to generate light transport path segments. For example, the subset may be used to generate light transport path segments that are stored along with their associated selected single dimension, and such single dimension may be used to select a subset of light transport path segments by being compared to a threshold.

Further still, in one embodiment, one or more vertices of the light transport path segments may be organized and stored in a tree. For example, each node in the tree may store the minimum selected component when compared to the children of the node. In this way, efficient pruning may be enabled while querying nodes of the hierarchy. In another embodiment, the pruning of the tree may be used with a photon mapping method. In yet another embodiment, the pruning of the tree may be used with a method using shadow rays to determine illumination.

Also, in one embodiment, the subset of the low discrepancy sequence may be used in photon mapping. For example, a density of a photon map may be varied, utilizing a selected threshold to generate a subset. In another example, the density of the photon map may be associated with an importance of a location in order to determine a threshold. In another embodiment, the low discrepancy sequence may be used to generate a first photon map. For example, the low discrepancy sequence may be used to generate photon trajectories within the photon map. In yet another embodiment, the subset of the low discrepancy sequence may be used to generate a second photon map having a lower density than the first photon map.

Additionally, in one embodiment, an additional threshold value may be determined. In another embodiment, an additional single dimension of the low discrepancy sequence may be selected. In yet another embodiment, for each element included within the low discrepancy sequence, the selected single dimension may be compared to the determined threshold value, and the selected additional single dimension may be compared to the determined additional threshold value. For example, both comparisons may be performed simultaneously. In still another embodiment, a subset of the low discrepancy sequence may be generated, based on the comparing. In this way, more than one dimension of the low discrepancy sequence may be simultaneously compared to their respective threshold.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
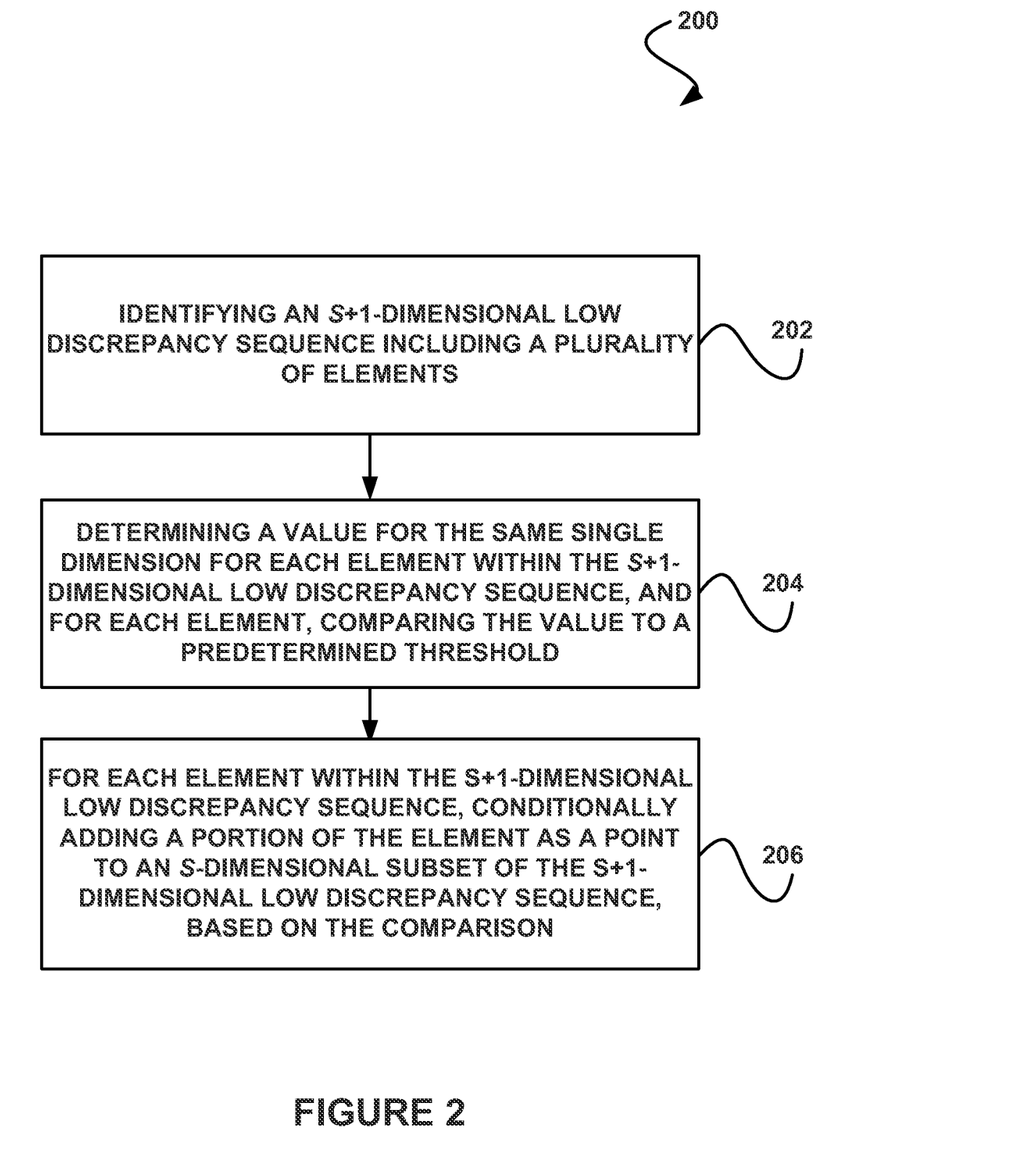
FIG. 2 shows a method for generating an s-dimensional subset of an s+1-dimensional low discrepancy sequence, in accordance with another embodiment.

FIG. 2 shows a method 200 for generating an s-dimensional subset of an s+1-dimensional low discrepancy sequence, in accordance with another embodiment. As an option, the method 200 may be carried out in the context of the functionality of FIG. 1. Of course, however, the method 200 may be implemented in any desired environment. It should also be noted that the aforementioned definitions may apply during the present description.

As shown in operation 202, an s+1-dimensional low discrepancy sequence including a plurality of elements is identified. For example, the s+1-dimensional low discrepancy sequence may include a plurality of elements (e.g., vectors, etc.) having a low discrepancy. In another example, each element within the s+1-dimensional low discrepancy sequence may have s+1 dimensions.

Additionally, as shown in operation 204, a value is determined for the same single dimension for each element within the s+1-dimensional low discrepancy sequence, and for each element, such value is compared to a predetermined threshold. For example, each of the elements within the s+1-dimensional low discrepancy sequence may have a value for the same plurality of dimensions, and the same dimension may be selected for each element within the s+1-dimensional low discrepancy sequence, the value for such dimension may be identified for each element, and such value may be compared to a predetermined threshold value, Further, as shown in operation 206, for each element within the s+1-dimensional low discrepancy sequence, a portion of the element is conditionally added as a point to an s-dimensional subset of the s+1-dimensional low discrepancy sequence, based on the comparison. For example, for each element within the s+1-dimensional low discrepancy sequence, if it is determined that the value for the identified single dimension is less than the predetermined threshold value, the remaining values for all other dimensions of the element may be used to create a point within the s-dimensional subset of the s+1-dimensional low discrepancy sequence.

In another example, for each element within the s+1-dimensional low discrepancy sequence, if it is determined that the value for the identified single dimension is equal to or greater than the predetermined threshold value, the remaining values for all other dimensions of the element may not be used to create a point within the s-dimensional subset of the s+1-dimensional low discrepancy sequence. In this way, only data from elements having a single dimension value less than the predetermined threshold may be used to create points within the subset.

Further still, in one embodiment, in numerical simulations involving the inverse-square law it may be beneficial to adapt integration to spatial distance, which may result in a uniform integration over the solid angle. In another embodiment, a hierarchical integration scheme may be used for n-body simulation that arranges the bodies in space using a kd-tree. See, for example, "An efficient program for many-body simulation" (A. Appel, SIAM J. Sci. Stat. Comput., 6(1):85-103, 1985), which is hereby incorporated by reference in its entirety. In another embodiment, nodes within the tree may store average properties of their children. Gravitational forces between the bodies may then be computed by descending the hierarchy until, sufficient precision could be guaranteed, which may result in an O(n log n) algorithm instead of a naive O(n$^2$) approach.

Also, in one embodiment, the above approach may form the basis of hierarchical radiosity methods and light cuts technology in computer graphics. See, for example, "Lightcuts: A scalable approach to illumination" (Walter et al., In ACM Transactions on Graphics (Proc. SIGGRAPH 2005), pages 1098-1107, 2005), and "Bidirectional lightcuts" (Walter et al., ACM Transactions on Graphics (TOG)—Proceedings of ACM SIGGRAPH 2012 TOG, vol. 31(4), article no. 59, 2012), which are hereby incorporated by reference in their entirety. In another embodiment, a quasi-Monte Carlo integro-approximation algorithm may allow for varying the sampling density instead of clustering and averaging. This numerical scheme may be consistent and thus may be guaranteed to converge without any approximation artifacts.

Additionally, in one embodiment, with respect to photon mapping, radiance may be computed by density estimation, (e.g., by counting how many photons hit a defined area, etc.). See, for example, "Quasi-Monte Carlo Progressive Photon Mapping" (Keller et al., In Monte Carlo and Quasi-Monte Carlo Methods 2010, pages 501-511. Springer, 2012), and "Deterministic consistent density estimation for light transport simulation" (Keller et al., In Monte Carlo and Quasi-Monte Carlo Methods 2012, to appear. Springer, 2013), which are hereby incorporated by reference in their entirety. In another embodiment, it may be desirable to generate one photon map and vary its density depending on the importance of the query location. This may be achieved by using one low discrepancy sequence to generate the photon trajectories and to define arbitrarily less dense subsequences of this sequence, which may be of low discrepancy, too. The combination with the blockwise enumeration of low discrepancy sequences may then yield an efficient consistent numerical algorithm.

Further, in one embodiment, the method of dependent tests may approximate parametric integrals by using the same set of samples for all values of the parameter y. In another embodiment, an application of deterministic low-discrepancy sequences may lead to consistent numerical schemes on $L^2$. See, for example, "On the calculation of certain integrals dependent on a parameter by the Monte Carlo method" (Frolov et al., Zh. Vychisl. Mat. Fiz., 2(4):714-717, 1962), "Random Number Generation and Quasi-Monte Carlo Methods" (H. Niederreiter, SIAM, Philadelphia, 1992), and "Myths of computer graphics" (A. Keller, Monte Carlo and Quasi-Monte Carlo Methods 2004, pages 217-243. Springer, 2006), which are hereby incorporated by reference in their entirety.

Further still, in one embodiment, introducing a sampling density $t(y) \in [0,1]$ that determines the fraction of samples to use for the parameter y may improve the computational efficiency. Integrating over the characteristic function $\chi_{[0,t(y))}(z)$, which is one for $z<t(y)$ and zero otherwise, may result in a desired fraction of samples by adding one dimension to the problem. Table 1 illustrates an exemplary integro-approximation equation, in accordance with one embodiment. Of course, it should be noted that the exemplary integro-approximation shown in Table 1 is set forth for illustrative purposes only, and thus should not be construed as limiting in any manner.

TABLE 1

$$f(y) := \int_{[0,1)^s} g(x, y) dx$$

$$= \int_{[0,1)^s} \underbrace{\frac{1}{t(y)} \int_0^1 \chi_{[0,t(y))}(z) dz}_{=1} \cdot g(x, y) dx$$

$$= \lim_{n \to \infty} \frac{1}{n \cdot t(y)} \sum_{i=0}^{n-1} \chi_{[0,t(y))}(z_i) \cdot g(x_i, y)$$

Also, in one embodiment, the approximation may be computed in a consistent way by using only one s+1-dimensional low discrepancy sequence $(z_i, \chi_{i,1}, \ldots, \chi_{i,s}) \in [0, 1)^{s+1}$ for all values of y. Note that any of the s+1 dimensions may be selected as $z_i$ and that for any y, the points selected for the evaluation of g may be low discrepancy, too, because they may result from omitting one of the s+1 components. See, for example, "Parallel Quasi-Monte Carlo Integration by Partitioning Low Discrepancy Sequences" (Keller et al., Monte Carlo and Quasi-Monte Carlo Methods 2010, pages 489-500. Springer, 2012), which is hereby incorporated by reference in its entirety.

In addition, in one embodiment, let the set $^t P$ be the sequence of points $(\chi_{i,1}, \ldots, \chi_{i,s}) \in [0, 1)^s$ with $z_i < t$. Consequently all sequences of points $^{t'}P$ with $t' < t$ may be subsets of $^t P$, (e.g., $^{t'}P \subset {}^t P$), and therefore such sequences may be called nested. In another embodiment, using a block-wise enumeration scheme and applying thresholding within each block may result in a deterministic consistent numerical algorithm for the above equation in FIG. 1. In yet another embodiment, nested sequences may be used in consistent algorithms, where several problems may use the samples of one sequence. For example, depending on the single problem, a threshold may be selected to control what fraction of samples is consumed.

Further, in one embodiment, nested low discrepancy sequences may be enumerated. In another embodiment, other than comparing a threshold t to the selected component $z_i$, a subsequence may be enumerated directly. For example, if $z_i = \Phi_b(i)$ and $t = b^{-k}$ for a non-negative integer k, the subsequence of points may be enumerated by leaping using a stride of $b^k$.

Further still, in one embodiment, for an ordered set $t_0 \leq t_1 \ldots \leq t_l$ of thresholds, the points also may be enumerated for each interval $[t_k, t_{k+1})$ which may form a kind of level set. As above, this may be very efficient for thresholds of the form $t_k = b^{-k}$ for nonnegative integers k or $$t_k = \frac{h}{b^m}$$

for $0 \leq k < b^m$.

Also, in one embodiment, in an example of the s+1-dimensional Halton sequence, any radical inverse $\Phi_b$ may be used to select the fraction t(y) of the remaining s-dimensional points by $z_i = \Phi_b(i) < t(y)$. In another embodiment, $^t H$ may denote the points $x_i$ of the Halton sequence without their first dimension that fulfill $\Phi_2(i) < t$. Then $^1 H$ may be the Halton sequence without its first dimension and $$\tfrac{1}{2} H$$

may be the subset of $^1 H$ with $$\Phi_2(i) < \frac{1}{2}.$$

As a consequence, $$\tfrac{1}{2^k} H \subset \ldots \subset \tfrac{1}{2} H \subset {}^1 H,$$

where each sequence $$\tfrac{1}{2^k} H$$

may be of low discrepancy.

Additionally, in one embodiment, using the inverse radical inverse, the points may be enumerated with strictly monotonously increasing $z_i$. The same may work for any radical inverse based low discrepancy sequence (e.g., the Sobol' sequence or rank-1 lattice sequences, etc.). See, for example, "Extensible lattice sequences for quasi-Monte Carlo quadrature" (Hickernell et al., SIAM J. Sci. Comput., 22:1117-1138, 2001), which is hereby incorporated by reference in its entirety.

Further, in one embodiment, the above subset generation may be used to generate multi-resolution photon clouds that can be used as point light sources or for photon mapping. For example, the photon cloud may be generated according to the block-wise generation of photon trajectories using low discrepancy sequences and may be extended by storing $z_i$ with each light path or photon. In another embodiment, given a level of detail t, all paths or photons with $z_i \geq t$ may then be excluded from the subset. In another embodiment, the threshold may vary locally (e.g., proportional to importance., etc.). In yet another embodiment, the threshold also may be chosen proportional to a distance, which may include the length of a ray or a path, etc.

Further still, in one embodiment, for efficient access, the points may be organized in a hierarchy (e.g., as a kd-tree in space, a bounding volume hierarchy, etc.). See, for example, "Maximizing parallelism in the construction of BVHs, octrees, and k-d trees" (T. Karras, High-Performance Graphics 2012, pages 33-37. Eurographics Association, 2012), which is hereby incorporated by reference in its entirety. In another embodiment, storing the minimum $z_i$ of each subtree in its root node may allow for efficient pruning of subtrees according to any given threshold. In this way, the point cloud may be accessed with any desired density while still remaining consistent due to block-wise enumeration.

Figure 3:
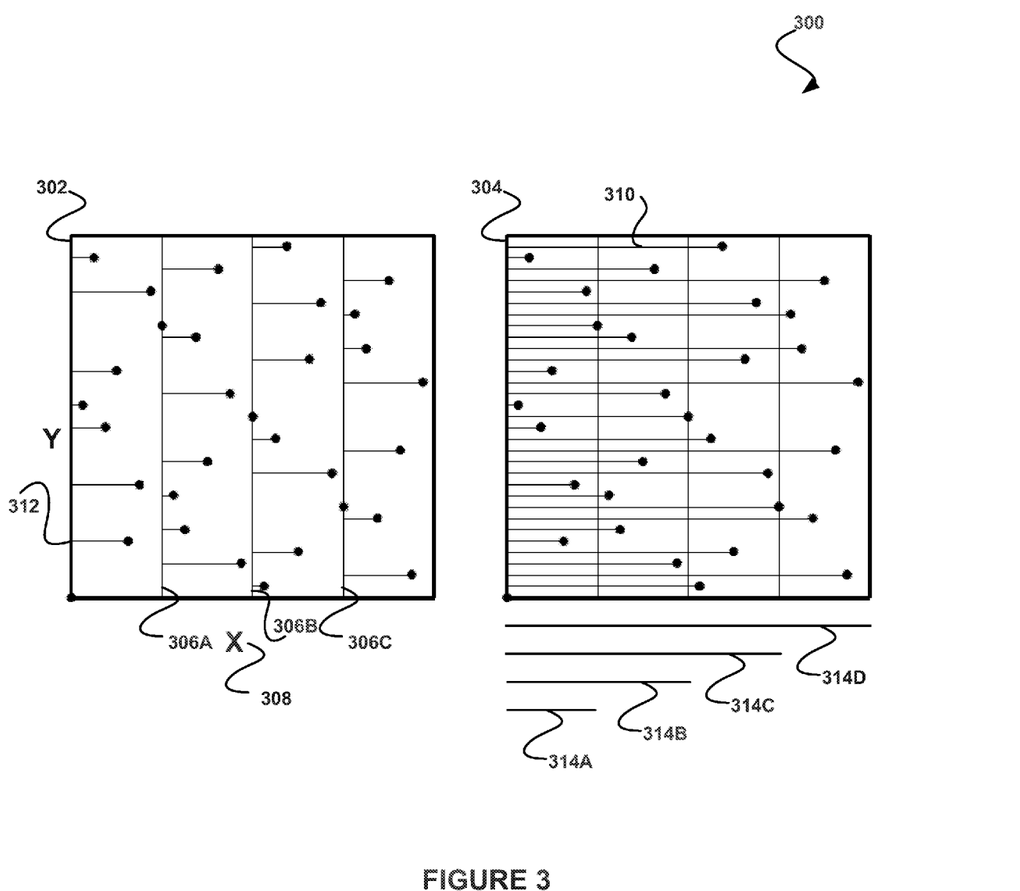
FIG. 3 shows an exemplary illustration of partitioned and nested low discrepancy sequences, in accordance with another embodiment.

FIG. 3 shows an exemplary illustration 300 of partitioned and nested low discrepancy sequences, in accordance with another embodiment. As an option, the illustration 300 may be carried out in the context of the functionality of FIGS. 1-2. Of course, however, the illustration 300 may be implemented in any desired environment. It should also be noted that the aforementioned definitions may apply during the present description.

As shown, an s+1-dimensional low discrepancy sequence 302 may include the first 32 points of the Sohol' sequence. Additionally, the s+1-dimensional low discrepancy sequence 302 may be partitioned 306A-C by a first component 308, where the first component 308 includes the x-axis of the s+1-dimensional low discrepancy sequence 302. This results in one low discrepancy sequence in s dimensions as illustrated by the projections 310 onto the partitioning lines 306A-C parallel to the y-axis 312 of the s+1-dimensional low discrepancy sequence 302.

Additionally, thresholding the first component 308 results in nested s-dimensional low discrepancy sequences 304, where each sequence 314A-D with a smaller threshold is included in a sequence with a larger threshold. In this way, the threshold t(y) may determine the fraction of samples selected from the original sequence and may contrast the scheme to partitioning low discrepancy sequences.

Figure 4:
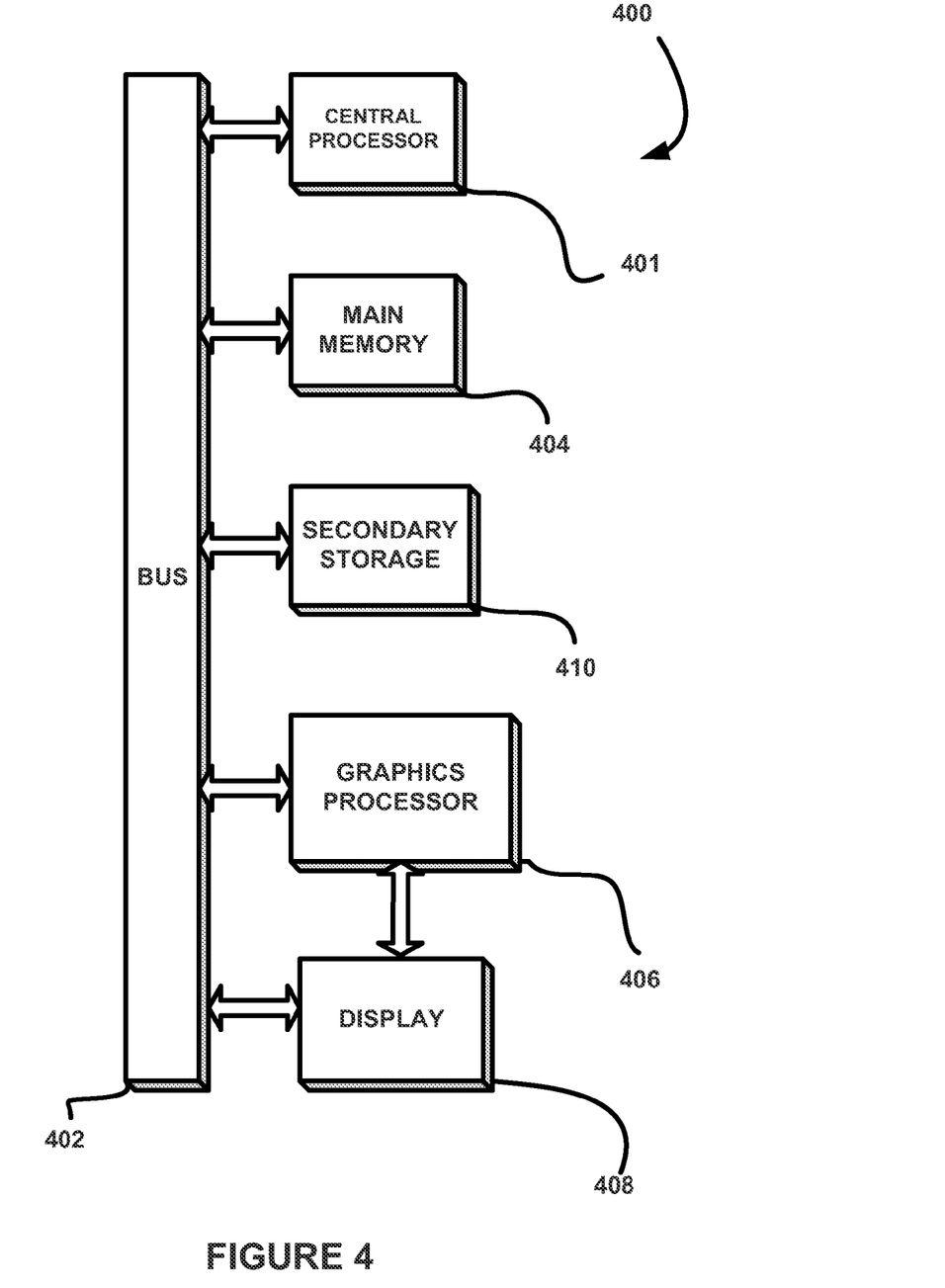
FIG. 4 illustrates an exemplary system in which the various architecture and/or functionality of the various previous embodiments may be implemented.

FIG. 4 illustrates an exemplary system 400 in which the various architecture and/or functionality of the various previous embodiments may be implemented. As shown, a system 400 is provided including at least one host processor 401 which is connected to a communication bus 402. The system 400 also includes a main memory 404. Control logic (software) and data are stored in the main memory 404 which may take the form of random access memory (RAM).

The system 400 also includes a graphics processor 406 and a display 408, i.e. a computer monitor. In one embodiment, the graphics processor 406 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user. The system may also be realized by reconfigurable logic which may include (but is not restricted to) field programmable gate arrays (FPGAs).

The system 400 may also include a secondary storage 410. The secondary storage 410 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 404 and/or the secondary storage 410. Such computer programs, when executed, enable the system 400 to perform various functions. Memory 404, storage 410, volatile or non-volatile storage, and/or any other type of storage are possible examples of non-transitory computer-readable media.

In one embodiment, the architecture and/or functionality of the various previous figures may be implemented in the context of the host processor 401, graphics processor 406, an integrated circuit (not shown) that is capable of at least a portion of the capabilities of both the host processor 401 and the graphics processor 406, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 400 may take the form of a desktop computer, laptop computer, and/or any other type of logic. Still yet, the system 400 may take the form of various other devices m including, but not limited to a personal digital assistant (PDA) device, a mobile phone device, a television, etc.

Further, while not shown, the system 400 may be coupled to a network [e.g. a telecommunications network, local area network (LAN), wireless network, wide area network (WAN) such as the Internet, peer-to-peer network, cable network, etc.] for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   identifying, by a hardware processor of a system, an image to be displayed by the system;
   sampling, by the hardware processor, an image plane of the image to be displayed, where the sampling results in a low discrepancy sequence associated with the image;
   determining, by the hardware processor, a threshold value;
   selecting, by the hardware processor, a single dimension of the low discrepancy sequence;
   for each element included within the low discrepancy sequence, comparing, by the hardware processor, the selected single dimension to the determined threshold value;
   generating by the hardware processor a subset of the low discrepancy sequence, based on the comparing; and
   determining, by the hardware processor, a plurality of light transport path segments associated with the image to be displayed, utilizing the subset of the low discrepancy sequence.

2. The method of claim 1, wherein the threshold value is determined based on an importance of a location to be shaded.

3. The method of claim 1, wherein comparing the determined threshold value to the selected single dimension includes determining for each element whether the value for the selected single dimension of the element is less than the determined threshold value.

4. The method of claim 1, wherein the subset of the low discrepancy sequence includes a set of points.

5. The method of claim 1, wherein for each element included within the low discrepancy sequence, if a value for the selected single dimension is determined to be less than the determined threshold value, the values for the remaining dimensions of that element are included as values for dimensions of a new element of the subset.

6. The method of claim 1, wherein the generated subset of the low discrepancy sequence has one less dimension than the low discrepancy sequence.

7. The method of claim 1, wherein the generated subset of the low discrepancy sequence has a low discrepancy.

8. The method of claim 1, wherein the threshold is selected depending on a parameter of an integro-approximation problem, and the generated subset is used for numeric integro-approximation.

9. The method of claim 1, wherein the subset is generated by a block-wise enumeration of the low discrepancy sequence.

10. The method of claim 1, wherein the subset is generated by leaping through the low discrepancy sequence.

11. The method of claim 1, wherein the subset is enumerated for a range defined by two thresholds.

12. The method of claim 1, wherein for each element included within the low discrepancy sequence, the selected single dimension is compared to two determined threshold values.

13. The method of claim 1, wherein the subset is used to generate light transport path segments that are stored along with their associated selected single dimension, and such single dimension may be used to select a subset of light transport path segments by being compared to a threshold.

14. The method of claim 1, wherein one or more vertices of the light transport path segments are organized and stored in a tree.

15. The method of claim 14, wherein each node in the tree stores a minimum selected component when compared to all nodes of its subtree.

16. The method of claim 14, wherein pruning of the tree is used with a photon mapping method.

17. The method of claim 14, wherein pruning of the tree is used with a method using shadow rays to determine illumination.

18. The method of claim 1, comprising:

- determining, by the hardware processor, an additional threshold value;
- selecting, by the hardware processor, an additional single dimension of the low discrepancy sequence;
- for each element included within the low discrepancy sequence, simultaneously comparing, by the hardware processor, the selected single dimension to the determined threshold value and comparing the selected additional single dimension to the determined additional threshold value; and
- generating, by the hardware processor, a subset of the low discrepancy sequence, based on the comparing.

19. A non-transitory computer-readable storage medium storing instructions that, when executed by a hardware processor of a system, cause the hardware processor to perform steps comprising:

- identifying, by the hardware processor of the system, an image to be displayed by the system;
- sampling, by the hardware processor, an image plane of the image to be displayed, where the sampling results in a low discrepancy sequence associated with the image;
- determining, by the hardware processor, a threshold value;
- selecting, by the hardware processor, a single dimension of the low discrepancy sequence;
- for each element included within the low discrepancy sequence, comparing, by the hardware processor, the selected single dimension to the determined threshold value;
- generating by the hardware processor a subset of the low discrepancy sequence, based on the comparing; and
- determining, by the hardware processor, a plurality of light transport path segments associated with the image to be displayed, utilizing the subset of the low discrepancy sequence.

20. A system, comprising:

a hardware processor configured to:

- identifying an image to be displayed by the system;
- sampling an image plane of the image to be displayed, where the sampling results in a low discrepancy sequence associated with the image; determining a threshold value; selecting a single dimension of the low discrepancy sequence;
- for each element included within the low discrepancy sequence, comparing the selected single dimension to the determined threshold value;
- generating a subset of the low discrepancy sequence, based on the comparing; and determining a plurality of light transport path segments associated with the image to be displayed, utilizing the subset of the low discrepancy sequence.

* * * * *